Figure 1:
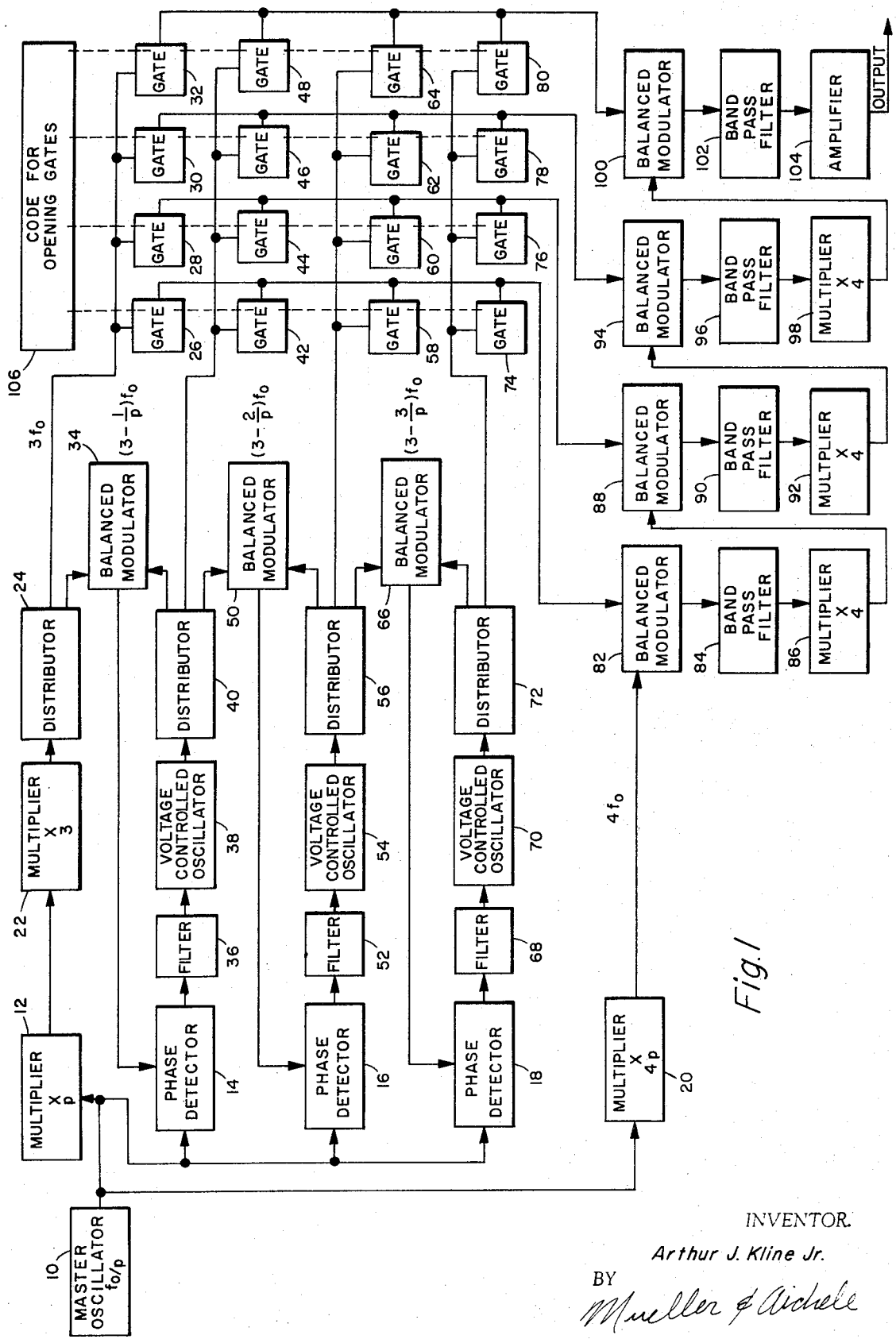

United States Patent
Kline, Jr.

[15] 3,696,306
[45] Oct. 3, 1972

[54] COHERENT JUMP FREQUENCY SYNTHESIZER

[72] Inventor: Arthur J. Kline, Jr., Scottsdale, Ariz.

[73] Assignee: Motorola, Inc., Franklin Park, Ill.

[22] Filed: June 5, 1970

[21] Appl. No.: 43,752

[52] U.S. Cl. ............... 331/2, 325/146, 325/153, 331/22
[51] Int. Cl. ............................................. H03b 3/06
[58] Field of Search ....... 331/11, 2, 22; 325/146, 153

[56] References Cited

UNITED STATES PATENTS

| | | |
|---|---|---|
| 2,595,608 | 5/1952 | Robinson et al............331/11 |
| 2,786,140 | 3/1957 | Lewis.........................331/22 |
| 2,838,673 | 6/1958 | Fernsler et al...............331/11 |
| 2,956,239 | 10/1960 | Hugenholtz et al.........331/11 |

*Primary Examiner*—John Kominski
*Attorney*—Mueller & Aichele

[57] ABSTRACT

Means are provided to produce an output wave whose frequency may jump from one value to a very different frequency at a high jump rate, the phase of the produced jump frequency wave being unambiguous and predictable.

4 Claims, 4 Drawing Figures

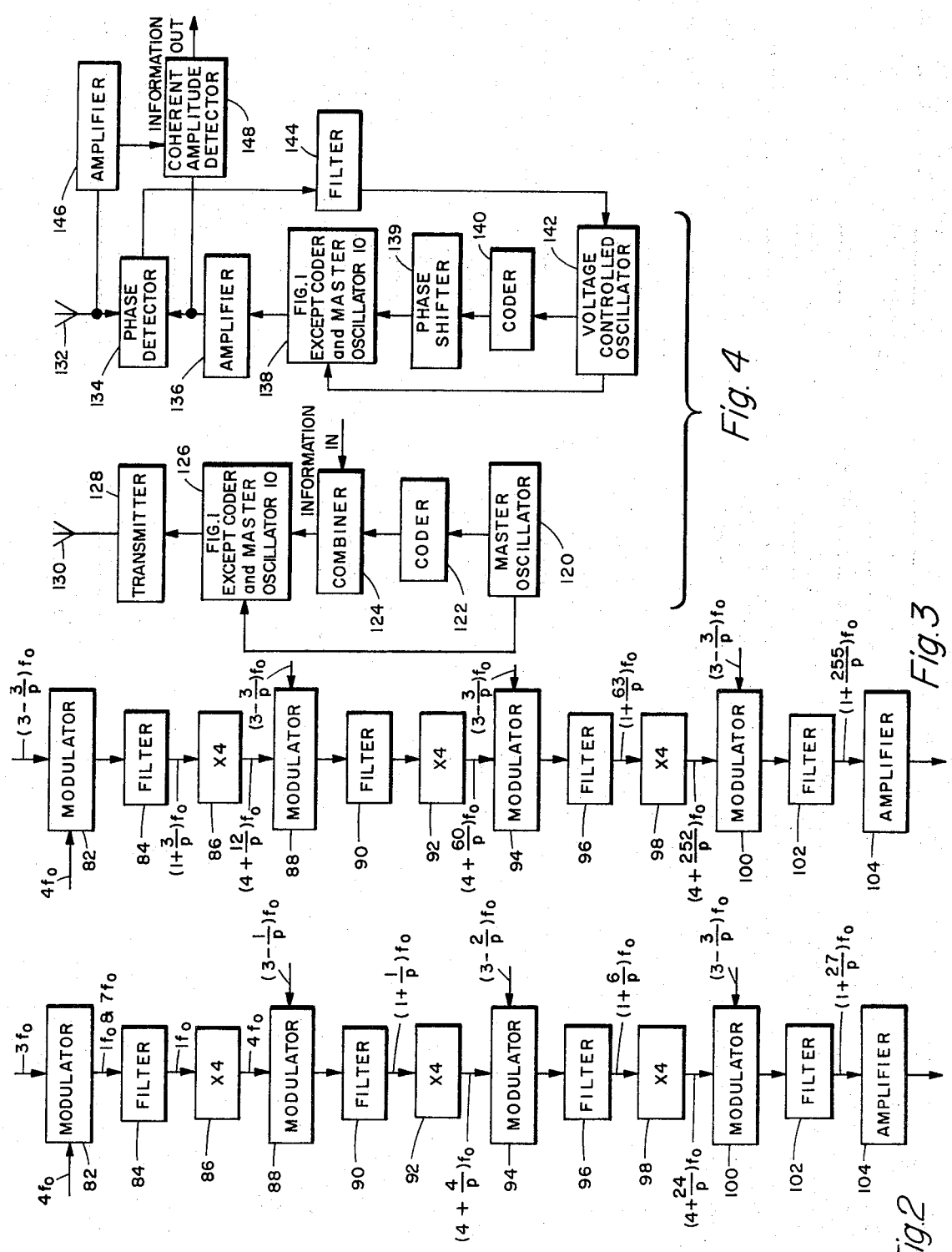

COHERENT JUMP FREQUENCY SYNTHESIZER

BACKGROUND

It is known to provide a transmitted wave which is difficult to jam by causing the transmitted wave to jump from one frequency to another very different frequency at a high rate of speed. However, the presently known jump frequency producing equipment produces an output wave with phase ambiguities, whereby a coherent detector cannot be used. The advantages of the use of a jump frequency wave for anti-jamming is that the jamming wave must be spread over the large wave band in which the jump frequency waves will appear, whereby the energy of the jamming wave is spread out, while the energy of the jump frequency wave is concentrated in its own instantaneous frequency. If coherent detectors are used, the detector detects the wave of the transmitted frequency, whatever that frequency may be from time to time, whereby the frequency band to which the coherent detector is sensitive is very narrow, cutting down the effect of the jamming wave. If the phase of the transmitted frequency cannot be predicated, a noncoherent detector must be used for receiving the jump frequency wave. The signal and jamming waves will mix together in such a detector whereby the jamming wave is much more effective than if a coherent detector could be used to detect a frequency jump wave. Therefore, hitherto, the jump frequency wave was penalized for security purposes since the security advantages of the jump frequency were lost to a great extent by the necessity of using a noncoherent detector.

It is an object of this invention to provide an improved jump frequency transmitter or an improved jump frequency synthesizer.

It is another object of this invention to provide a means for producing a phase coherent jump frequency wave.

SUMMARY

In accordance with this invention, the jump frequency waves are produced by beating together two waves or by beating the product of the first beating with another wave as many times as is desired, the several waves that are beat being chosen by a coder. The waves that are beat against each other are produced by phase controlled oscillators and/or by multiplication of given waves or beating together other waves which are so produced. The so produced jump wave is transmitted and compared with a jump wave produced exactly the same manner at the receiver. These two waves are coherent, that is, they are of the same frequency at the same time and at all times, unless one of the waves is modulated, the two waves, whatever their frequency may be, have an unvarying phase relation with respect to each other since no apparatus is used in producing these waves which produces an ambiguous phase relation. At the transmitter, the transmitted wave may be modulated by information to be transmitted as by changing the frequency thereof slightly for example, from the wave frequency that would otherwise have been transmitted, whereby the received jump wave and the locally produced jump wave are not of the same frequency from time to time in accordance with information to be transmitted. The coherent comparator or detector detects the differences in the transmitted and locally produced waves to reproduce the transmitted information.

DESCRIPTION

This invention will be better understood upon reading the following description in connection with the accompanying drawing in which FIG. 1 is a block diagram of the means to produce a coherent jump frequency wave in accordance with this invention, FIGS. 2 and 3 are block diagrams which are useful in explaining the operation of this invention, and FIG. 4 is a block diagram of a transmitter-receiver combination using the coherent jump frequency wave producing means of FIG. 1.

The system of FIG. 1 will be described first. Any numbers used in the description are exemplary only. Many other numbers may be used if desired. Also, parts of the system to be described may be duplicated to add more output frequencies of the produced jump frequency waves or parts may be omitted to cut down on the number of frequencies of the output jump frequency waves.

A master oscillator 10 is provided whose output frequency may be called $f_o/p$. The output of the master oscillator 10 is fed to a frequency multiplier 12 which multiplies by $p$, to several phase detectors 14, 16 and 18 and to a frequency multiplier 20, which multiplies by 4p for example. It is known that frequency multipliers multiply the phase of the applied wave by the multiplication factor of the multiplier in a nonambiguous manner, whereby the outputs of the multipliers 12 and 20 are coherent with respect to a wave of similar phase similarly multiplied. The output of the multiplier 12 is applied to a multiplier 22 which multiplies by 3. The output of the multiplier 22 is applied to a distributor 24, which may be a tapped resistor. The two outputs of the distributor 24 are each equal to $3f_o$. One output of the distributor 24 is applied to each gate 26, 28, 30 and 32 of a row of gates, and the other output of the distributor 24 is applied to an input of a balanced modulator 34.

The output of the phase detector 14 is applied to a filter 36. The output of the filter 36 is applied to a voltage controlled oscillator [hereinafter VCO] 38 and the output of the VCO 38 is applied to a distributor 40 having three outputs. One of the outputs of the distributor 40 is applied to the balanced modulator 34. The other output of the distributor 40 is applied to each of the gates 42, 44, 46 and 48 of a second row of gates. The third output of the distributor 40 is applied to a balanced modulator 50. The output of the balanced modulator 34 is applied to the phase detector 14. This output wave that is applied to the phase detector 14 is the result of beating the wave produced by the VCO 38 and the multiplied wave produced by the multipliers 12 and 22. It is known that when two waves are beat, the phase relation of the produced difference frequency wave is produced in a nonambiguous manner, that is the phase of the wave applied to the phase detector 14 is the difference of the phases of the waves applied to the balanced modulator 34. Since the frequency of the waves applied to the phase detector 14 by the balanced modulator 34 and by the master oscillator 10 are equal, then due to the operation of the phase detector 14, the phase of the output wave of the VCO 38 is controlled with respect to the phase of the wave output of the master oscillator 10 in a known manner, that is, if the phase of the output of the VCO 38 varies, a voltage is applied thereto by the phase detector 14 to bring the phase of the output of the VCO 38 back to the desired value Also, the output frequency of the VCO 38 which is applied to the gates 42, 44, 46 and 48 is equal to $[3 - 1/p]f_o$ as shown. Similarly, a phase controlled wave of frequency $[3 - 2/p]f_o$ is produced by the elements comprising the phase detector 16, a filter 52 which is coupled to the output of the phase detector 16, a VCO 54 which is coupled to the output of the filter 52 and a distributor 56 which is coupled to the output of the VCO 54, an output of the distributor 56 being applied to the balanced modulator 50. Furthermore, the distributor 56 is connected to apply the wave of controlled phase and of frequency equal to $[3 - 2/p]f_o$ to each gate of the row of gates 58, 60, 62 and 64. The distributor 56 also is connected to apply a wave to a balanced modulator 66. Similarly, a phase controlled wave of $[3 - 3/p]f_o$ is provided by the phase detector 18, a filter 68, a VCO 70, and a distributor 72, similarly connected. The phase controlled wave of frequency $[3 - 3p]f_o$ is applied by the distributor 72 to a row of gates comprising the gates 74, 76, 78 and 80. It is noticed that the gates 26, 42, 58 and 74 are arranged in a column, that the gates 28, 44, 60 and 76 are arranged in a second column, that the gates 30, 46, 62 and 78 are arranged in a third column and that the gates 32, 48, 64 and 80 are arranged in a fourth column. It is also noted that phase controlled waves, which may be close together in frequency (depending on the value of p as will be shown), are applied to the gates in the respective rows. Furthermore, the beat frequency output of the balanced modulators 34, 50 and 66 is equal to $f_o/p$, whereby the outputs of the VCOs 38, 54 and 70 is phase controlled by the output of the master oscillator 10 in a nonambiguous manner.

The output of the frequency multiplier 20, which is equal to $4f_o$, is applied to an input of a balanced modulator 82 to the other input of which the output of the first column of gates 26, 42, 58 and 74 is connected. The output of the balanced modulator 82 is applied to bandpass filter 84 and the output of the bandpass filter 84 is applied to a multiply by 4 frequency multiplier 86, whose output is applied to an input of a balanced modulator 88.

The output of the column of gates 28, 44, 60 and 76 is applied to the other input of the balanced modulator 88, the output of the balanced modulator 88 is applied to a bandpass filter 90 and the output of the bandpass filter 90 is applied to the input of a multiply by 4 frequency multiplier 92 whose output is applied to an input of a balanced modulator 94.

The output of the balanced modulator 94 is applied to a bandpass filter 96 whose output is applied to a multiply by 4 frequency multiplier 98. The output of the frequency multiplier 98 is applied to one input of a balanced modulator 100 to the other input of which the output of the column of gates 32, 48, 64 and 80 are connected. The output of the balanced modulator 100 is connected to a bandpass filter 102, the output of which is connected to the input of an amplifier 104. The output of the amplifier 104 may be one of a great many discrete frequencies which are separated by a greater or less frequency interval as will be explained.

A coder 106 is provided. This coder 106 is so connected that one gate only of each column of gates is open, in the sense of permitting the passage of a wave therethrough, and only one gate, whichever it may be, in each column of gates is always on. Therefore, any wave or waves appearing at the distributors 24, 40, 56 and 72 may be applied to any one or more balanced modulators 82, 88, 94 and/or 100, but not more than one wave is applied at any one time to any modulator 82, 88, 94 and 100 of the waves appearing in the distributors 24, 40, 56 and 72. The coder connection to the gates is indicated by the dotted lines. The coder 106 is set to cause the wave at the output of the amplifier 104 to vary from one wave in a wide wave band to another, which, depending on the setting of the coder, may be at any place in the band from one extreme to the other. The output of the amplifier 104 is at one frequency for a very short period of time. The various frequencies in the band are discrete and the possible adjacent frequencies are close together depending on the size of $p$ and may, for example, be 10,000 Hz. Since the output wave varies as described, the output wave is very hard to jam. However, since no ambiguous phase shifts are provided by any of the equipment of FIG. 1, the beat note between the output of this equipment and that of another equipment similar thereto and properly coded, will produce a wave whose frequency is the same from instant to instant and whose phase relation is the same at all times, therefore, coherent detection of the wave produced by the equipment of FIG. 1 is possible.

An example of how an output wave frequency is determined will be given. The output frequency of the distributors 24, 40, 56 and 72 are unchanging and are equal to $3f_o$, $[3 - 1/p]f_o$, $[3 - 2/p]f_o$ and $[3 - 3/p]f_o$. Let it be assumed that the gates 26, 44, 62 and 80 are opened by the coder 106, whereby waves of these frequencies are applied to the balanced modulators 82, 88, 94 and 100, respectively, as shown in FIG. 2. The wave applied to the other input of the balanced modulator 82 is $4f_o$ whereby the output of the modulator 82 is $1f_o$ and $7f_o$. The bandpass filter 84 chooses $7f_o$ which is changed to $4f_o$ by the multiplier 86 and applied to the other input of the modulator 88. The output of the bandpass filter 90 is $4f_o - [3 - 7/p]f_o$ which is equal to $[1 + 1/p]f_o$ and the wave applied to the other input of the balanced modulator 94 is $[1 + p]f_o$. The output of the bandpass filter 96 is $4[1 + 1/p]f_o - [3 - 2/p]f_o$ which is equal to $[1 + 6/p]f_o$. The output of the bandpass filter 102 is $4[1 + 6/p]f_o - [3 - 3/p]f_o$ which is equal to $[1 + 27/p]f_o$.

Now, let it be assumed that $3f_o$ is applied to all the balanced modulators 82, 88, 94 and 100. Then, by inspection, the output of the bandpass filter 102 is $f_o$. Now, let it be assumed that $3f_o$ is applied to each of the modulators 82, 88 and 94 and that $[3 - 1/p]f_o$ is applied to the modulator 100. Then the output of the bandpass filter 102 is $[1 + 1/p]f_o$. That is, the smallest interval between frequencies produced by the circuit of FIG. 1 is determined by the size of $p$. If $f_o$ is one megahertz, for example, and if $p$ is 100, the difference between adjacent frequencies is 10K Hz. Similarly, if $f_o$ was 10 MHz for the same interval or difference frequency between adjacent frequencies, $p$ is equal to 1,000. If $[3 - 3/p]f_o$ is applied to all the balanced modulators 82, 88, 94 and 100 in the system as shown in FIG. 1, the maximum output frequency is $[3 + 225/p]f_o$ whereby the maximum wave band of the equipment of FIG. 1 is $255/p\ f_o$. This is illustrated in FIG. 3. It is understood that the number of jump frequencies may be multiplied by adding voltage controlled oscillator strings such as the elements 14, 36, 38, 40 and 34 or modulator multiplier strings such as the elements 82, 84 and 86 or 88, 90 and 92, whereby the number of output frequencies can be increased, and the difference between extreme frequencies produced by the apparatus of FIG. 1 may be increased.

One use to which the device of FIG. 1 may be put is shown in FIG. 4. In FIG. 4, a transmitter comprises a master oscillator 120, a coder 122, a combiner 124, the frequency jump apparatus of FIG. 1 illustrated by the rectangle 126, and a transmitter 128, which applies a wave to an antenna 130, which, in the absence of application of information to the combiner 124, jumps around in a manner set by the coder 122 but always at a fixed or coherent phase relation. This wave is applied to the antenna 132 of the receiver comprising a phase detector 132, an amplifier 136, the frequency jump apparatus of FIG. 1 which is indicated by 138 in the receiver part of FIG. 4, a coder 140 and a VCO 142. The phase of the VCO 142 is locked in by the phase detector 134 in a known manner. The coder 140 is set to code the apparatus 138 in the same manner as the coder 122 is set to code the apparatus 124. Therefore, the wave output of the amplifier 136 fed by the apparatus 138 and of the amplifier 146 fed by the wave picked up by the antenna 132 are always the same and coherent as long as no information is applied to the combiner 124. The receiver is locked to the transmitter by varying a phase shifter 139 which is coupled between the coder 140 and the equipment 138, until the coherent amplitude detector shows maximum output. Then the transmitter and receiver are locked together. Then, information is fed into the combiner 124. This changes the coding whereby momentarily the frequencies of the waves in the antenna 130 and at the output of the amplifier 136 are not the same. This is noted by the coherent amplitude detector 148 in a manner to reproduce the information. For example, if the two frequencies are the same during any time interval, the signal may be a zero and if the two frequencies are different, at another time interval, for example, the signal may be a one of a binary code. The transmitter is transmitting coherent frequencies which jump from frequency to frequency over a wide band, the wave remaining at one frequency only for a very short instant of time, and the transmitted wave remains coherent so that coherent detectors can be used, whereby jamming is difficult. Many other such transmitters and receivers are known in which the apparatus of FIG. 1 may be used. One such known use may be frequency jump radio ranging.

What is claimed is:

1. Apparatus for producing a coherent wave which may jump in frequency to and from the different frequencies in a wave band comprising:

a wave source having a given frequency,
a first voltage controlled oscillator,
a first frequency multiplier,
a first phase detector,
a first modulator,
means for applying the wave of said source to said multiplier and to said phase detector,
means to apply the output of said phase detector to said voltage controlled oscillator,
means to apply the output of said voltage controlled oscillator and of said frequency multiplier to said modulator,
means to apply one output of said modulator to said phase detector, the difference in frequencies of the two inputs to said modulator being equal to said given frequency whereby the output of said voltage controlled oscillator is in fixed relation phase with respect to said given frequency,
a second phase detector,
a second voltage controlled oscillator,
a second modulator,
means for applying the wave of said given frequency to said second phase detector,
means for applying the output of said second phase detector to said second voltage controlled oscillator,
means for applying the wave produced by said first and second voltage controlled oscillators to said second modulator, and
means for applying the output of said second modulator to said second phase detector,
the frequency of the wave produced by said first and second voltage controlled oscillators being different and their difference in frequency being equal to said given frequency whereby said waves produced by said second voltage controlled oscillator are also coherent.

2. The apparatus according to claim 1 comprising:
a second multiplier for receiving the wave of said given frequency,
a third modulator having two inputs,
means for applying the output of said second multiplier to one input of said third modulator, and
means for applying the output of one of said first multiplier and of said first voltage controlled oscillator to the other input of said third modulator.

3. The apparatus according to claim 1 comprising:
a second multiplier for receiving the wave of said given frequency,
a third modulator having two inputs,
means for applying the output of said second multiplier to one input of said third modulator, and
means for applying the output of one of said first multiplier and the output of one of said voltage controlled oscillators to said third modular.

4. The apparatus according to claim 3 comprising:
a fourth modulator,
means including a third frequency multiplier to apply the output of said third modulator to an input of said fourth modulator,
means for applying a selected one of the outputs of said first multiplier and said first and second voltage controlled oscillators to one of said third and fourth modulators.

* * * * *